US012499829B2

(12) United States Patent
Bi

(10) Patent No.: US 12,499,829 B2
(45) Date of Patent: Dec. 16, 2025

(54) DISPLAY DEVICE AND COMPENSATION METHOD THEREOF

(71) Applicant: Shenzhen China Star Optoelectronics Semiconductor Display Technology Co., Ltd., Guangdong (CN)

(72) Inventor: Tao Bi, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/633,490

(22) Filed: Apr. 11, 2024

(65) Prior Publication Data

US 2025/0201189 A1 Jun. 19, 2025

(30) Foreign Application Priority Data

Dec. 13, 2023 (CN) ......................... 202311718485.3

(51) Int. Cl.

*G09G 3/32* (2016.01)
*G09G 3/3233* (2016.01)
*G09G 3/3291* (2016.01)

(52) U.S. Cl.

CPC ......... *G09G 3/3233* (2013.01); *G09G 3/3291* (2013.01); *G09G 2310/027* (2013.01); *G09G 2310/08* (2013.01)

(58) Field of Classification Search

CPC ............................................... G09G 3/30–3291
See application file for complete search history.

(56) References Cited

U.S. PATENT DOCUMENTS

2022/0262295 A1* 8/2022 Kim ..................... G09G 3/2007

* cited by examiner

*Primary Examiner* — Roy P Rabindranath
(74) *Attorney, Agent, or Firm* — PV IP PC; Wei Te Chung

(57) ABSTRACT

The application relates to a display device and a compensation method thereof. The pixel circuit of the display device includes a driving transistor and a light-emitting device, which are connected to a first node. The compensation method firstly obtains the initial data voltage of a target sub-pixel, obtains and determines the voltage offset of the first node based on the initial data voltage, and determines the target data voltage of the target sub-pixel according to the initial data voltage and the voltage offset of the first node.

19 Claims, 4 Drawing Sheets

DISPLAY DEVICE AND COMPENSATION METHOD THEREOF

CROSS-REFERENCE TO RELATED APPLICATION

This application claims priority to and the benefit of Chinese Patent Application No. 202311718485.3, filed on Dec. 13, 2023, the disclosure of which is incorporated herein by reference in its entirety.

TECHNICAL FIELD

The application relates to a technical field of display, in particular to a display device and a compensation method thereof.

BACKGROUND

Organic light-emitting diode (OLED) display technology is a new type of display technology. With advantages of low power consumption, high saturation, fast response time and wide viewing angle, the OLED display technology has gradually attracted people's attention and occupied a certain position in the field of panel display technology.

In the related art, a pixel circuit including a driving transistor is usually disposed in a sub-pixel of an OLED display panel, but due to the leakage current, the potential of the source terminal of the output transistor deviates, which leads to the deviation of the potential difference between the gate terminal and the source terminal of the driving transistor, that is, the working current flowing into the light-emitting device deviates, which makes the display of the display panel abnormal.

SUMMARY

The application provides a display device and a compensation method thereof, so as to solve the technical problem that the working current of a light-emitting device in the existing display device deviates.

In order to solve the above problems, the technical solution provided by this application is as follows.

The present application provides a compensation method for a display device, wherein the display device comprises a plurality of sub-pixels with a pixel circuit, and each pixel circuit comprises a switching transistor, a driving transistor and a light-emitting device, wherein a first electrode of the driving transistor is connected with a first potential line, a second electrode of the driving transistor and an anode of the light-emitting device are electrically connected with a first node, the first electrode of the switching transistor is connected with a data signal terminal, and a second electrode of the switching transistor is connected with a second node, wherein the compensation method comprises: obtaining an initial data voltage of a target sub-pixel; obtaining a correlation curve between a data voltage and a voltage offset of the first node; determining the voltage offset of the first node according to the initial data voltage and the correlation curve between the data voltage and the voltage offset of the first node; determining a target data voltage of the target sub-pixel according to the initial data voltage and the voltage offset of the first node; inputting the target data voltage to the data signal terminal of the target sub-pixel.

In the compensation method of the present application, a cathode of the light-emitting device is electrically connected with a second potential line, and obtaining the correlation curve between the data voltage and the voltage offset of the first node comprises:

- obtaining a first test voltage of the second potential line of one test sub-pixel of the plurality of sub-pixels under a reference data voltage;
- obtaining a plurality of second test voltages of the second potential line of the test sub-pixel under different test data voltages;
- obtaining a correlation curve between the data voltage and a voltage offset of the second potential line according to a plurality of differences between the first test voltage and the second test voltages;
- according to the correlation curve between the data voltage and the voltage offset of the second potential line, and based on a correlation curve between the voltage offset of the second potential line and the voltage offset of the first node to obtain a correlation curve between the data voltage and the voltage offset of the first node of the test sub-pixel;
- obtaining a correlation curve between the data voltage and the voltage offset of the first node of the display device according to the correlation curve between the data voltage and the voltage offset of the first node of the test sub-pixel.

In the compensation method of the present application, the cathode of the light-emitting device is electrically connected with the second potential line, and obtaining the correlation curve between the data voltage and the voltage offset of the first node comprises:

- obtaining a third test voltage of the first node of a test sub-pixel of the plurality of sub-pixels under a reference data voltage;
- obtaining a plurality of fourth test voltages of the first node of the test sub-pixel under different test data voltages;
- according to a plurality of differences between the third test voltage and the fourth test voltages to obtain a correlation curve between the data voltage and the voltage offset of the first node of the test sub-pixel;
- obtaining a correlation curve between the data voltage and the voltage offset of the first node of the display device according to the correlation curve between the data voltage and the voltage offset of the first node of the test sub-pixel.

In the compensation method of the present application, before a step of obtaining the first test voltage of the second potential line of the test sub-pixel of the plurality of sub-pixels under the reference data voltage, the compensation method further comprises:

- obtaining a plurality of input driving voltages of the second nodes of the plurality of sub-pixels and a plurality of input data voltages of the data signal terminals of the plurality of sub-pixels;
- in a case that a difference between one of the plurality of input driving voltages and one of the plurality of input data voltage is less than a first threshold, one of the plurality of sub-pixels is the test sub-pixel.

In the compensation method of the present application, obtaining the correlation curve between the data voltage and the voltage offset of the first node of the display device according to the correlation curve between the data voltage and the voltage offset of the first node of the test sub-pixel comprises:

- obtaining correlation curves
  - between the data voltages and the voltage offset of the first node of the test sub-pixels;

fitting the correlation curves between the data voltages and the voltage offset of the first node of the test sub-pixels to obtain the correlation curve between the data voltage and the voltage offset of the first node of the display device.

In the compensation method of the present application, a display gray scale of the test sub-pixel under the reference data voltage is 0, and the display gray scale of the test sub-pixel under different test data voltages is greater than 0.

In the compensation method of the present application, determining the target data voltage of the target sub-pixel according to the initial data voltage and the voltage offset of the first node comprises:

obtaining a first output voltage of the first node;

obtaining a second output voltage of the first node according to the first output voltage and the voltage offset of the first node;

determining the target data voltage of the target sub-pixel according to the initial data voltage and the second output voltage.

In the compensation method of the present application, determining the target data voltage of the target sub-pixel according to the initial data voltage and the voltage offset of the first node comprises:

obtaining an initial compensation coefficient of the initial data voltage;

determining a compensation offset coefficient according to the initial data voltage and the voltage offset of the first node;

determining a target compensation coefficient of the initial data voltage according to the initial compensation coefficient and the compensation offset coefficient;

determining the target data voltage of the target sub-pixel according to the target compensation coefficient and the initial data voltage.

The present application also provides a display device, wherein the display device comprises a display panel, the display panel comprises a plurality of sub-pixels with a pixel circuit, wherein each pixel circuit comprises a switching transistor, a driving transistor and a light-emitting device; a first electrode of the driving transistor is connected with a first potential line; a second electrode of the driving transistor and an anode of the light-emitting device are electrically connected with a first node; the first electrode of the switching transistor is connected with a data signal terminal; and a second electrode of the switching transistor is connected with a second node; wherein, the display device further comprises:

a data processor, the data processor is configured to obtain an initial data voltage of a target sub-pixel, and to input the target data voltage to the data signal terminal of the target sub-pixel;

a detection device, the detection device is configured to obtain a correlation curve between a data voltage and a voltage offset of the first node, and to determine the voltage offset of the first node according to the initial data voltage and the correlation curve between the data voltage and the voltage offset of the first node;

a controller, the controller is configured to determine a target data voltage of the target sub-pixel according to the initial data voltage and the voltage offset of the first node.

In the display device of the present application, the pixel circuit further comprises:

a detection device connected to the cathode of the light-emitting device and a second potential line, and used for obtaining the potential of the second potential line.

The application relates to a display device and a compensation method thereof. The pixel circuit of the display device includes a driving transistor and a light-emitting device, which are connected to a first node. The compensation method firstly obtains the initial data voltage of a target sub-pixel, obtains and determines the voltage offset of the first node based on the initial data voltage and the correlation curve between the data voltage and the voltage offset of the first node, and according to the initial data voltage and the voltage offset of the first node to determine the target date voltage of the target sub-pixel.

BRIEF DESCRIPTION OF THE DRAWINGS

The technical solution and other beneficial effects of this application will be obvious by describing the embodiments of this application in detail with the drawings.

DETAILED DESCRIPTION

In the following, the technical solution in the embodiment of the application will be described clearly and completely with the drawings. Obviously, the described embodiments are only a part of the embodiments of this application, not all embodiments. Based on the embodiments in the present application, all other embodiments obtained by a person skilled in the art without involving any inventive effort are within the scope of the present application.

Figure 1:
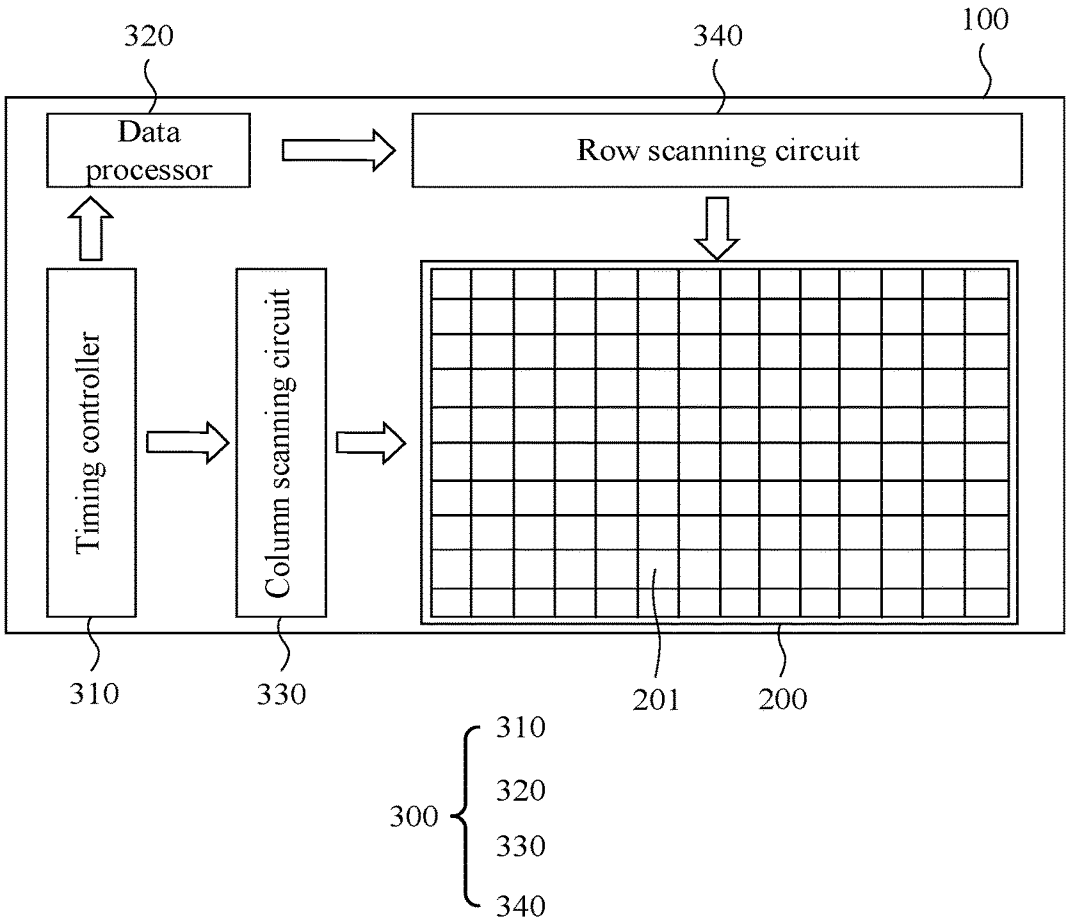
FIG. 1 is a structural diagram of a display device according to the present application.
Figure 2:
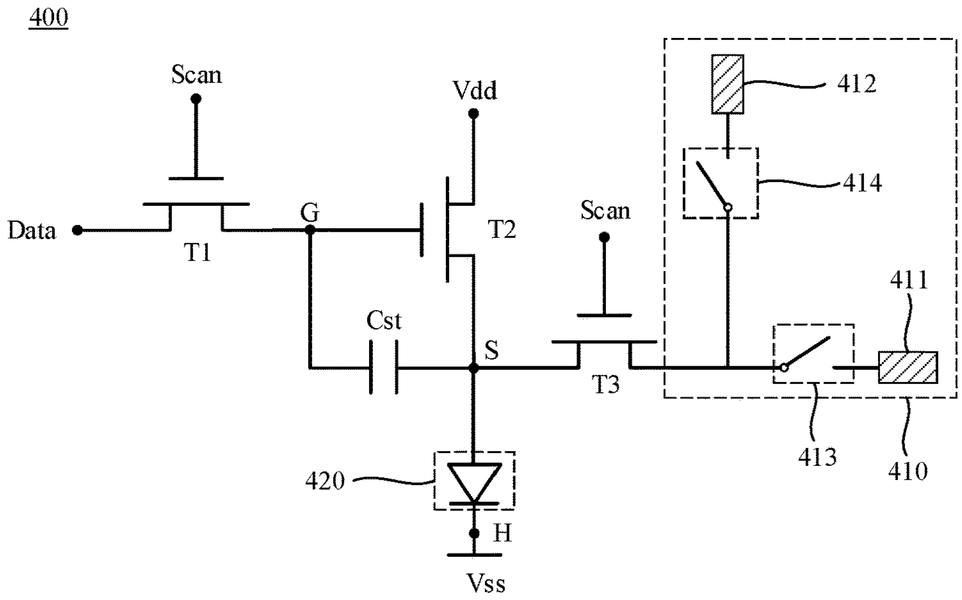
FIG. 2 is a first structural diagram of a pixel circuit of s display device according to the present application.

Referring to FIG. 1 and FIG. 2, a display device 100 includes a display panel 200 and a driving module 300, the display panel 200 includes a plurality of data lines and a plurality of scanning lines. One data line is connected with a plurality of data signal terminals Data, and one scanning line is connected with a plurality of scanning signal terminals Scan. The data lines and scanning lines enclose a plurality of sub-pixels 201, and each sub-pixel 201 is provided with a pixel circuit 400.

In the structure of FIG. 1, the driving module 300 may include a timing controller 310, a data processor 320, a row scanning circuit 330 and a column scanning circuit 340, wherein the timing controller 310 controls the row scanning circuit 330 to output scanning signals to the display panel 200, the timing controller 310 outputs image data signals to the data processor 320, and the data processor 320 transmits data voltage signals to the column scanning circuit 340 based on the image data signals.

It should be noted that the row scanning circuit 330 and/or the column scanning circuit 340 can also be directly integrated in the display panel 200.

In the structure of FIG. 2, the pixel circuit 400 includes a switching transistor T1, a driving transistor T2 and a calibration transistor T3, a gate of the switching transistor T1 is connected with the scanning signal terminal Scan, a first electrode of the switching transistor T1 is connected with the data signal terminal Data, a second electrode of the switching transistor T1 and a gate of the driving transistor T2 are connected with a second node G, a first electrode of the driving transistor T2 is connected with a first potential line VDD, a second electrode of the driving transistor T2 and a anode of the light-emitting device 420 are connected to a first node S, a cathode of the light-emitting device 420 and a second potential line VSS are connected to a third node H, a first electrode of the calibration transistor T3 is connected to a calibration module 410, a gate of the calibration transistor T3 is connected to the scanning signal terminal Scan, and a second electrode of the calibration transistor T3 is connected to the second electrode of the driving transistor T2 and the anode of the light-emitting device 420.

In this embodiment, the calibration module 410 includes a calibration device 411 and a measurement device 412, a first switch 413 is connected between the first electrode of the calibration device 411 and the calibration transistor T3, and a second switch 414 is connected between the measurement device 412 and the first electrode of the calibration device 411. The calibration device 411 is configured for calibrating the potential of the first node S to a reference potential, and the measurement device 41 is configured for obtaining the potential of the first node S.

It should be noted that the first potential line VDD is a high potential line, and the second potential line VSS is a low potential line.

It should be noted that the first electrode in this application is one of the source or the drain, and the second electrode is the other of the source or the drain; the following embodiments describe the technical solution of the application with the first electrode as the drain and the second electrode as the source.

At the detection stage of the pixel circuit 400 in FIG. 2, in a case that the sub-pixel 201 in FIG. 1 changes from a black image to a white image, the first node S leaks electricity to the light-emitting device 420 and transmits it to the second potential line VSS, so the potential of the first node S is lower than the preset potential, and the working current of the light-emitting device 420 is determined based on the potential difference between the second node G and the first node S. Under a condition that the potential of the second node G remains unchanged, the potential of the first node S decreases, the actual working current of the light-emitting device 420 is greater than the target working current, resulting in abnormal display on the display panel 200. Based on the above technical problems, the present application provides a compensation method for the display device 100.

In this embodiment, the pixel circuit 400 can be a circuit with 2T1C, 3T1C, 4T1C and other structures, and the following embodiment will take the 3T1C pixel circuit 400 in FIG. 2 as an example.

Figure 3:
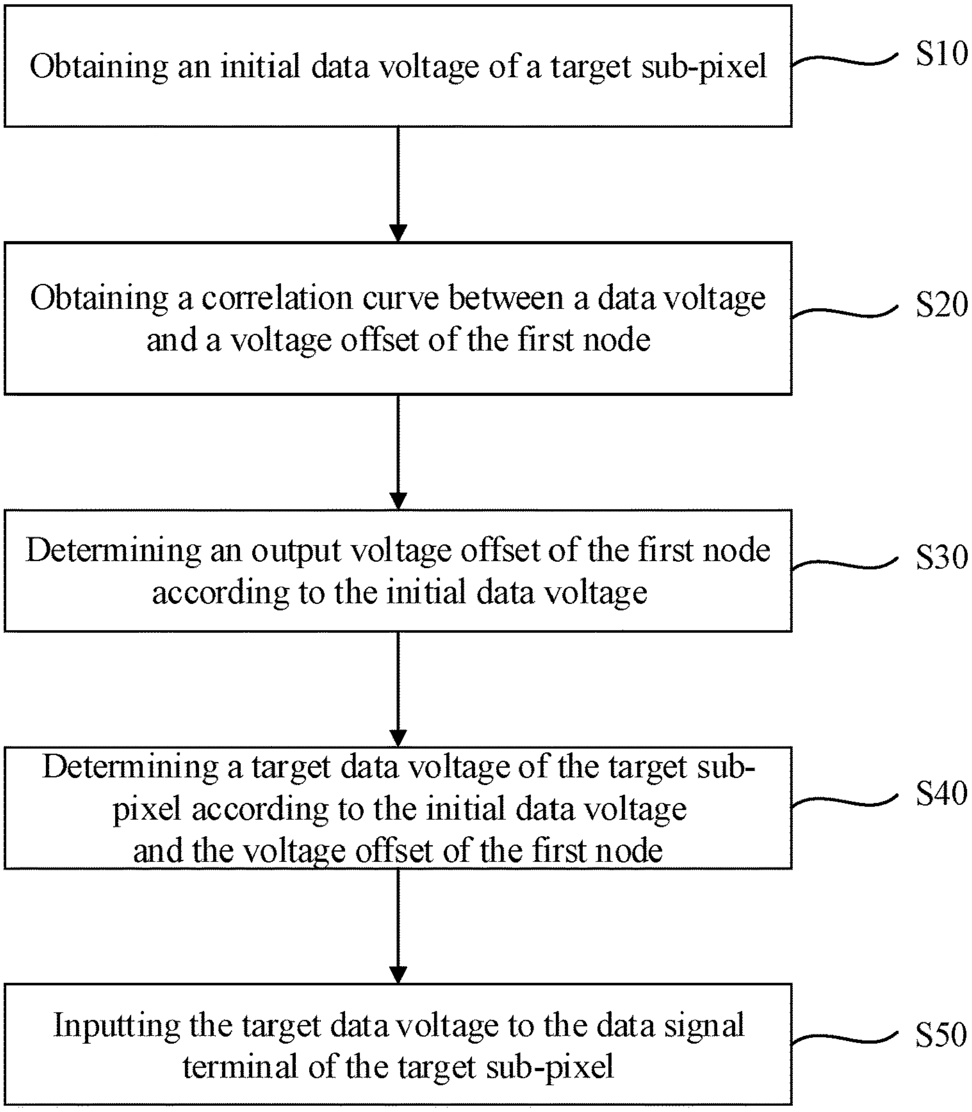
FIG. 3 is a flow block of a compensation method of display device according to the present application.

Referring to FIG. 1 to FIG. 3, the compensation method of the display device 100 may include: S10, obtaining an initial data voltage of a target sub-pixel; S20, obtaining a correlation curve between a data voltage and a voltage offset of the first node S; S30, determining an output voltage offset of the first node S according to the initial data voltage; S40, determining a target data voltage of the target sub-pixel according to the initial data voltage and the voltage offset of the first node S; and S50, inputting the target data voltage to the data signal terminal of the target sub-pixel.

In this application, the voltage offset of the first node S is obtained according to the correlation curve between the data voltage and the voltage offset of the first node S and based on the initial data voltage input to the target sub-pixel, and the data voltage input to the target sub-pixel is corrected according to the voltage offset of the first node S, thus eliminating the technical problem that the potential difference between the gate terminal and the source terminal of the driving transistor T2 is deviated and correcting the working current flowing into the light-emitting device 420.

It should be noted that the target sub-pixel can be any sub-pixel 201 of the display device 100, and the initial data voltage of the target sub-pixel can be the input data voltage Vdata of the data signal terminal Data connected to the first electrode of the switching transistor T1, and Vdata is the data voltage matched with the image data signal output by the timing controller 310. Due to the influence of resistance and capacitance, the image data signal output by the timing controller 310 does not match the required data voltage. Therefore, in a case that the data processor 320 outputs the data voltage, it is necessary to compensate the data voltage matched with the image data signal output by the timing controller 310, to obtain the display gray scale of the target sub-pixel as the target gray scale. Therefore, the data voltage received by the data signal terminal Data is usually N*Vdata, where n is the compensation coefficient.

It should be noted that the compensation of the data voltage can also be completed in the timing controller 310, that is, the timing controller 310 can directly output the image data signal matched with the data voltage N*Vdata.

The technical solution of the application is described below according to specific embodiments.

The leakage current transmitted from the second electrode of the driving transistor T2 to the light-emitting device 420 is different in a case that the driving transistor T2 receives different data voltages, as such, the correlation curve between the data voltage and the voltage offset of the first node S needs to be stored in the display device 100 before the data voltage input to the target sub-pixel is corrected, for example, the correlation curve can be stored in the driving module 300.

In this embodiment, the obtaining the correlation curve between the data voltage and the voltage offset of the first node S includes: obtaining a first test voltage of a second potential line VSS of one test sub-pixel of a plurality of sub-pixels 201 under a reference data voltage; obtaining a plurality of second test voltages of the second potential line VSS of the test sub-pixel under different test data voltages; obtaining a correlation curve between the data voltage and the voltage offset of the second potential line VSS according to a plurality of differences between the first test voltage and the second test voltages; according to the correlation curve between the data voltage and the voltage offset of the second potential line VSS, and based on the correlation curve between the voltage offset of the second potential line VSS and the voltage offset of the first node S, obtaining a correlation curve between the data voltage and the voltage offset of the first node S of the test sub-pixel; and according to the correlation curve between the data voltage and the voltage offset of the first node S of the test sub-pixel, obtaining a correlation curve between the data voltage and the voltage offset of the first node S of the display device 100.

In this embodiment, the correlation curve between the data voltage and the voltage offset of the first node S of the test sub-pixel may be the correlation curve between the initial data voltage and the voltage offset of the first node S of the test sub-pixel.

In this embodiment, any sub-pixel 201 of a plurality of sub-pixels 201 of the display device 100 is used as the test sub-pixel, and in a case that the input reference data voltage is N0*Vdata0, the first test voltage Vss0 of the second potential line VSS can be directly obtained by an external measuring device; in a case that the second potential line VSS transmits a low-level signal to the display panel 200, the potential of the low-level signal transmitted by the second potential line VSS is different from the low-level potential actually input to the display panel 200 due to resistance. Thus, the external measuring device of the application can directly measure the potential of the second potential line VSS at the receiving end of the low-level signal in the display panel 200 to reduce the error of the potential measurement of the second potential line VSS.

Figure 4:
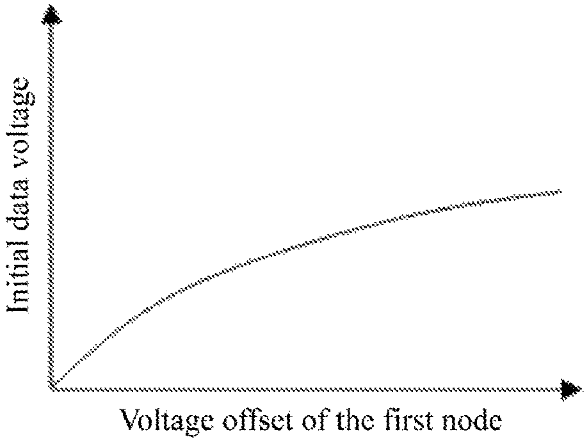
FIG. 4 is a curve related of an initial data voltage and a voltage offset of a second potential line of a display device according to the present application.

For different test data voltages, for example, in a case that the test data voltage is N1*Vdata1, the second test voltage of the second potential line VSS can be Vss1, so in a case that the initial data voltage is Vdata1, the voltage offset of the second potential line VSS is the difference between Vss1 and Vss0; in a case that the test data voltage is N2*Vdata2, the second test voltage of the second potential line VSS can be Vss2, so in a case that the initial data voltage is Vdata2, the voltage offset of the second potential line VSS is the difference between Vss2 and Vss0. Similarly, in a case that the test data voltage is Nn*Vdatan, the second test voltage of the second potential line VSS can be Vssn, so in a case that initial data voltage is Vdatan, the voltage offset of the second potential line VSS is the difference between Vssn and Vss0. The correlation curve Vss'=f (Vdata) between the initial data voltage and the voltage offset of the second potential line VSS in FIG. 4 can be obtained according to the above measured data, which can be stored in the driving module 300.

It should be noted that, since all transistors of the display device 100 are manufactured in the same process, the leakage current of each driving transistor T2 can be considered the same in this application, that is, in this embodiment, one sub-pixel 201 is used as the test sub-pixel, and the correlation curve between the data voltage and the voltage offset of the first node S of the test sub-pixel, which can be applied to all driving transistors T2 of the display device 100 to obtain the correlation curve between the initial data voltage of all the driving transistors T2 of the display device 100 and the voltage offset of the first node S. In this embodiment, since the voltage offset of the second potential line VSS is caused by the leakage of electricity from the first node S to the second potential line VSS, the voltage offset of the first node S is positively correlated with the voltage offset of the second potential line VSS, for example, the voltage offset of the first node S is Vs'=g*Vss', where g is the offset coefficient. According to the correlation curve between the voltage offset of the first node S and the voltage offset of the second potential line VSS, the correlation curve between the data voltage and the voltage offset of the first node S of the test sub-pixel is obtained.

It should be noted that, in a case that the sub-pixel 201 is in a black image, the output terminal of the driving transistor T2 does not transmit leakage current to the light-emitting device 420, and in a case that the sub-pixel 201 is in a white image, the output terminal of the driving transistor T2 transmits leakage current to the light-emitting device 420. Therefore, the application can take the potential of the second potential line VSS in a case that the display panel 200 displays a black image as a reference test potential, and take the potential of the second potential line VSS in a case that the display panel 200 displays a white image as an offset test potential; for example, the display gray scale of the test sub-pixel under the reference data voltage is 0, and the display gray scale of the test sub-pixel under different test data voltages is greater than 0.

Figure 5:
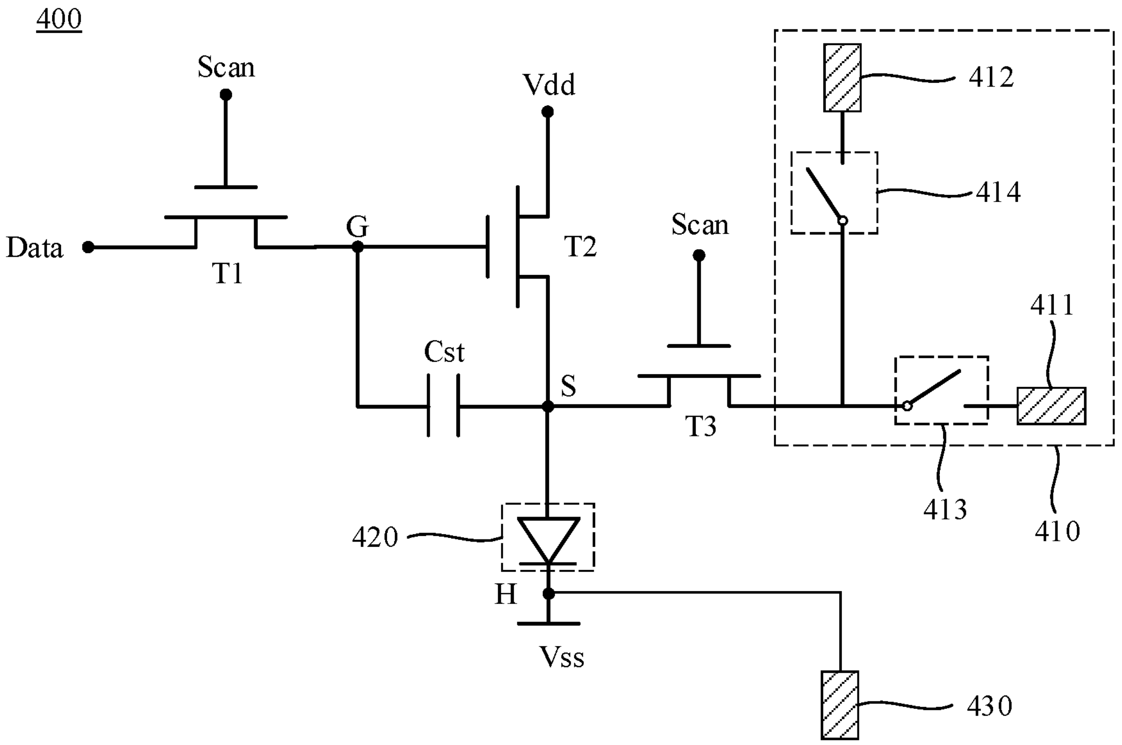
FIG. 5 is a second structural diagram of a pixel circuit of a display device according to the present application.

Referring to FIG. 5, in this application, a detection device 430 can be arranged at the third node H between the light-emitting device 420 and the second potential line VSS, and the detection device 430 can acquire the potential of the third node H in real time, and both the detection device 430 and the measurement device 412 can be the same type of sampling devices; alternatively, the potential of the third node His directly measured by the measuring device 412, and the potentials of the third node H and the first node S are obtained by time sharing.

Since the measuring device 412 can obtain the potential of the first node S, the application can also directly obtain the correlation curve between the potential of the first node S and the initial data voltage without measuring the potential of the second potential line VSS. Therefore, the obtaining the correlation curve between the data voltage and the voltage offset of the first node S includes: obtaining a third test voltage of a first node S of one test sub-pixel in a plurality of sub-pixels 201 under a reference data voltage; obtaining a plurality of fourth test voltages of the first node S of the test sub-pixels under different test data voltages; according to a plurality of differences between the third test voltage and the fourth test voltages, obtaining the correlation curve between the data voltage and the voltage offset of the first node S of the test sub-pixel; and according to the correlation curve between the data voltage and the voltage offset of the first node S of the test sub-pixel, obtaining the correlation curve between the data voltage and the voltage offset of the first node S of the display device 100.

Figure 6:
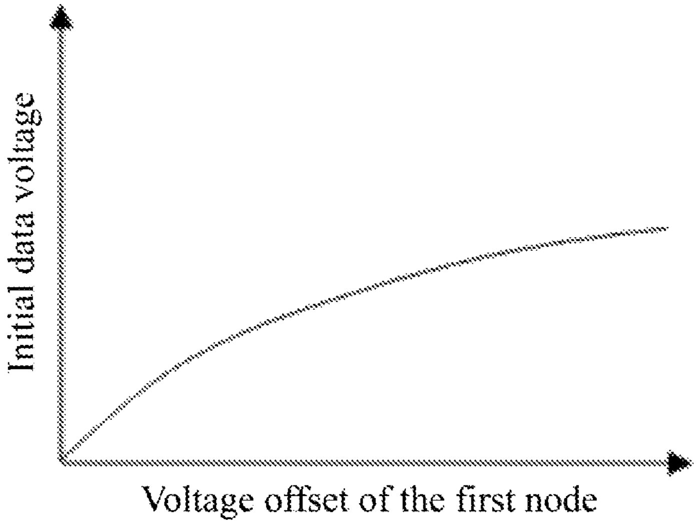
FIG. 6 is a curve related of an initial data voltage and a voltage offset of a first node of a display device according to the present application.

In this embodiment, taking any sub-pixel 201 of the plurality of sub-pixels 201 of the display device 100 as the test sub-pixel, in a case that the input reference data voltage is N0*Vdata0, the measurement device 412 can be configured to obtain the third test voltage Vs0 of the first node S. For different test data voltages, for example, in a case that the test data voltage is N1*Vdata1, the fourth test voltage of the first node S can be Vs1, so the voltage offset of the first node S is the difference between Vs1 and Vs0 in a case that the initial data voltage is Vdata1; in a case that the test data voltage is N2*Vdata2, the fourth test voltage of the first node S can be Vs2, so the voltage offset of the first node S is the difference between Vs2 and Vs0 in a case that the initial data voltage is Vdata2; in a case that the test data voltage is Nn*Vdatan, the fourth test voltage of the first node S can be Vsn, so the voltage offset of the first node S is the difference between Vsn and Vs0 in a case that the initial data voltage is Vdatan. According to the above measured data, the correlation curve Vs'=f(Vdata) between the initial data voltage and the voltage offset of the first node S in FIG. 6 is obtained.

Similarly, since all transistors of the display device 100 are manufactured in the same process, the leakage current of each driving transistor T2 can be considered the same in this application, that is, in this embodiment, one sub-pixel 201 is used as the test sub-pixel, and the correlation curve between the data voltage of the sub-pixel and the voltage offset of the first node S can be applied to all driving transistors T2 of the display device 100 to obtain the correlation curve between the initial data voltage and the voltage offset of the first node S in all driving transistors T2 of the display device 100.

At the same time, in the same process, the structures of different transistors may still be different, which leads to the difference of the threshold voltages of the driving transistors T2 of different sub-pixels 201, that is, for the driving transistors T2 of different sub-pixels 201, the correlation curves between the initial data voltages and the voltage offsets of the first nodes S are different.

On the basis of the above embodiment, the compensation method of the display device 100 may further include: obtaining correlation curves between data voltages and voltage offsets of the first nodes S of a plurality of test sub-pixels; and fitting the correlation curves between the data voltages and the voltage offsets of the first nodes S of a plurality of test sub-pixels to obtain the correlation curve between the data voltage and the voltage offset of the first node S of the display device 100.

The application can ensure the accuracy of the correlation curve between the initial data voltage and the voltage offset of the first node S in the display device 100 by measuring the correlation curves between the initial data voltages and the voltage offsets of the first nodes S of the driving transistors T2 of different sub-pixels 201 and fitting the correlation curves.

On the basis of the above embodiment, before the obtaining the first test voltage of the second potential line VSS of one test sub-pixel of the plurality of sub-pixels 201 under the reference data voltage, it may further include: obtaining input driving voltages of a plurality of sub-pixels 201 at the second nodes G, and inputting data voltages of data signal terminals Data in the plurality of sub-pixels 201. In a case that the difference between the input driving voltage and the input data voltage is less than the first threshold, the sub-pixel 201 is the test sub-pixel.

Due to the large number of sub-pixels 201 in the display device 100, the workload of obtaining the correlation curve between the initial data voltage and the voltage offset of the first node S of the driving transistor T2 in each sub-pixel 201 is large, so in this application, some sub-pixels 201 can be selected as test sub-pixels. For example, in the area near the driving module 300 in the display panel 200, a distance between the area and the driving module 300 is small, and the input data voltage is less affected by resistance and capacitance in the transmission process, while in the area with a large distance from the driving module 300, the input data voltage is more affected by resistance and capacitance in the transmission process, so the potential of the second node G in the pixel circuit 400 in the area near the driving module 300 is more accurate, and the difference between the potential of the second node G and the input data voltage transmitted from the data signal terminal Data is smaller, and the measurement accuracy of the voltage offset of the first node S is higher.

In this embodiment, the first threshold may be 0.1 V to 0.5 V.

In this application, the difference between the potential of the second node G and the input data voltage from the data signal terminal Data is taken as a reference, and the sub-pixel 201 with the difference less than the first threshold is taken as the test sub-pixel, so that the potential of the second node G is closer to the data voltage input from the data signal terminal Data, the potential of the second node G is more accurate, and the accuracy of measuring the voltage offset of the first node S is improved.

In this embodiment, the determining the target data voltage of the target sub-pixel according to the initial data voltage and the voltage offset of the first node S includes: obtaining a first output voltage of a first node S; obtaining a second output voltage of the first node S according to the voltage offset between the first output voltage and the voltage offset of the first node S; and determining the target data voltage of the target sub-pixel according to the initial data voltage and the second output voltage.

In this embodiment, the first output voltage is the actual potential of the first node S after the leakage of electricity, and the second output voltage is the potential of the first node S before the leakage of electricity. Therefore, it is necessary to correct the potential of the first node S to Vsb in this application. But the potential of the first node S cannot be accurately corrected, at this time, the data voltage input by the data signal terminal Data can only be corrected.

In this embodiment, since the initial data voltage Vdata of the target sub-pixel and the correlation curve Vs'=f (Vdata) between the initial data voltage and the voltage offset of the first node S are known, the voltage offset Vs' of the target sub-pixel at the first node S can be obtained.

In this embodiment, the first output voltage Vsa of the first node S is obtained by the measurement device 412, and the second output voltage Vsb of the first node S is the sum of Vsa and Vs' according to the voltage offset Vs' of the target sub-pixel at the first node S. According to the formula $I=K(Vg-Vs-Vth)^2$ of the working current of the light-emitting device 420, in a case that Vs is corrected to Vsb, a corrected working current can be obtained. However, under the condition of ensuring the same working current, Vs cannot be corrected to Vsb, so Vg is corrected to the target data voltage through the above formula to obtain the target data voltage of the target sub-pixel.

It should be noted that, since the data voltage transmitted by the data signal terminal Data can be N1*Vdata, and Vdata is not changed before and after the correction, the data voltage transmitted by the data signal terminal Data can be corrected to the target data voltage by correcting the compensation coefficient in the application, for example, the original data voltage N1*Vdata transmitted by the data signal terminal Data can be corrected to N2*Vdata.

In this embodiment, the determining the target data voltage of the target sub-pixel according to the initial data voltage and the voltage offset of the first node S includes: obtaining an initial compensation coefficient of an initial data voltage; determining a compensation offset coefficient according to the initial data voltage and the voltage offset of the first node S; determining the target compensation coefficient of the initial data voltage according to the initial compensation coefficient and the compensation offset coefficient; and determining the target data voltage of the target sub-pixel according to the target compensation coefficient and the initial data voltage.

In this embodiment, the data voltage transmitted by the data signal terminal Data before correction can be N1*Vdata, and the target data voltage transmitted by the data signal terminal Data after correction is N2*Vdata, so the difference between the data voltages before and after correction is equal to the voltage offset Vs' of the first node S, and it can be known that the target compensation coefficient N2 of the initial data voltage is N2=N1−(Vs'/Vdata). Since Vdata is not changed before and after the correction, the data voltage N1*Vdata transmitted by the original data signal terminal Data can be corrected to N2*Vdata=N1*Vdata−Vs' by the target compensation coefficient and the initial data voltage Vdata.

In this application, the correlation curve between the data voltage and the voltage offset of the first node S is stored in the driving module 300 in advance, for example, in the timing controller, and in a case that the timing controller outputs the initial data voltage to the target sub-pixel, the correlation curve is called, and the voltage offset of the first node S is obtained based on the initial data voltage input to the target sub-pixel, and the data voltage input to the target sub-pixel is corrected according to the voltage offset of the first node, so as to output the target data voltage to the data signal terminal Data, thereby eliminating the technical problem that the potential difference between the gate terminal and the source terminal of the driving transistor T2 is deviated, and the working current flowing into the light-emitting device 420 is corrected.

Referring to FIG. 1, the display device 100 includes a display panel 200 and a driving module 300, wherein the display panel 200 includes a plurality of data lines and a plurality of scanning lines, one data line is connected with a plurality of data signal terminals Data, one scanning line is connected with a plurality of scanning signal terminals Scan, and the plurality of data lines and scanning lines enclose a plurality of sub-pixels 201, and each sub-pixel 201 is provided with a pixel circuit 400.

In this embodiment, the pixel circuit 400 can be a circuit with 2T1C, 3T1C, 4T1C and other structures, and the following embodiment will take the 3T1C pixel circuit 400 in FIG. 2 as an example.

In this embodiment, referring to FIG. 2 and FIG. 5, the pixel circuit 400 includes a switching transistor T1, a driving transistor T2, and a calibration transistor T3, the gate of the switching transistor T1 is connected to the scanning signal terminal Scan, the first electrode of the switching transistor T1 is connected to the data signal terminal Data, and the second electrode of the switching transistor T1 and the gate of the driving transistor T2 are connected to the second node G, the first electrode of the driving transistor T2 is connected to the first potential line VDD, the second electrode of the driving transistor T2 and the anode of the light-emitting device 420 are connected to the first node S, the cathode of the light-emitting device 420 is connected to the second potential line VSS, the first electrode of the calibration transistor T3 is connected to the calibration module 410, the gate of the calibration transistor T3 is connected to the scanning signal terminal Scan, and the second electrode of the calibration transistor T3 is connected to the second electrode of the driving transistor T2 and the anode of the light-emitting device 420.

In this embodiment, referring to FIG. 5, the pixel circuit 400 further includes a detection device 430 connected to the third node H between the cathode of the light-emitting device 420 and the second potential line VSS, and the detection device 430 is used for obtaining the potential of the second potential line VSS.

Figure 7:
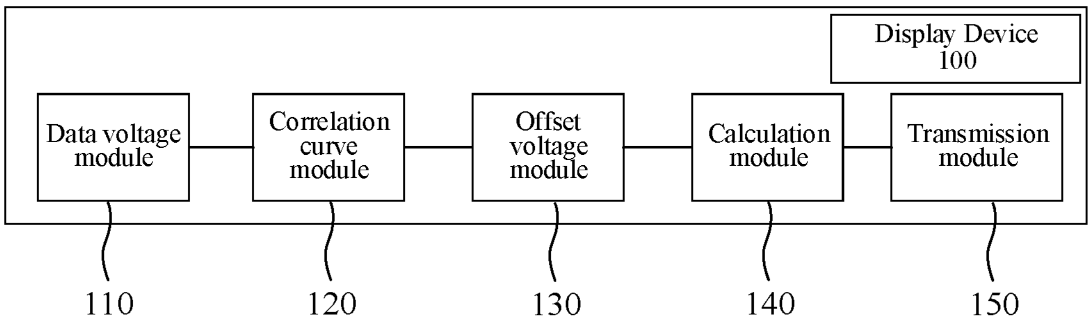
FIG. 7 is a layout of modules in a display device according to the present application.

Referring to FIG. 7, the display device 100 further includes a data voltage module 110, a correlation curve module 120, an offset voltage module 130, a calculation module 140 and a transmission module 150, where the data voltage module 110, the correlation curve module 120, the correlation curve module 130, the calculation module 140 and the transmission module 150 can all be disposed in the driving module 300, for example, integrated in the timing control.

In this embodiment, the data voltage module 110 is configured to obtain the initial data voltage of the target sub-pixel; the correlation curve module 120 is configured to obtain the correlation curve between the data voltage and the voltage offset of the first node S; the offset voltage module 130 is configured to determine the voltage offset of the first node S according to the initial data voltage and the correlation curve between the data voltage and the voltage offset of the first node S; the calculation module 140 is configured to determine the target data voltage of the target sub-pixel according to the initial data voltage and the voltage offset of the first node S; and the transmission module 150 is configured to input the target data voltage to the data signal terminal Data of the target sub-pixel.

In this embodiment, the display device 100 is also configured to: obtain the first test voltage of the second potential line VSS of the test sub-pixel of the plurality of sub-pixels 201 under the reference data voltage; obtain a plurality of second test voltages of the second potential line VSS of the test sub-pixel under different test data voltages; obtain the correlation curve between the data voltage and the voltage offset of the second potential line VSS according to a plurality of differences between the first test voltage and the second test voltages; and obtain the correlation curve between the data voltage and the voltage offset of the first node S of the test sub-pixel, according to the correlation curve between the data voltage and the voltage offset of the second potential line VSS, and based on the correlation curve between the voltage offset of the second potential line VSS and the voltage offset of the first node S.

In this embodiment, the display device 100 is also configured to: obtain the third test voltage of the first node S of one test sub-pixel of the plurality of sub-pixels 201 under the reference data voltage; obtain a plurality of fourth test voltages of the first node S of the test sub-pixel under different test data voltages; and obtain the correlation curve between the data voltage and the voltage offset of the first node S of the test sub-pixel according to a plurality of differences between the third test voltage and the fourth test voltages.

In this embodiment, the display device 100 is also configured to: obtain the input driving voltages of a plurality of sub-pixels 201 at the second node G and the input data voltages of the data signal terminals Data of the plurality of sub-pixels 201; in a case that the difference between the input driving voltage and the input data voltage is less than the first threshold, the sub-pixel 201 is the test sub-pixel.

In this embodiment, the display device 100 is also configured to: obtain the correlation curves between the data voltages and the voltage offsets of the first nodes S of a plurality of test sub-pixels; fit the correlation curves between the data voltages and the voltage offsets of the first nodes S of a plurality of test sub-pixels to obtain the correlation curve between the data voltage and the voltage offset of the first node S of the display device 100.

In this embodiment, the display device 100 is further configured to: obtain a first output voltage of the first node S; obtain a second output voltage of the first node S according to the first output voltage and the output voltage offset; and determine the target data voltage of the target sub-pixel according to the initial data voltage and the second output voltage.

In this embodiment, the display device 100 is also configured to: obtain the initial compensation coefficient of the initial data voltage; determine a compensation offset coefficient according to the initial data voltage and the voltage offset of the first node S; determine the target compensation coefficient of the initial data voltage according to the initial compensation coefficient and the compensation offset coefficient; and determine the target data voltage of the target sub-pixel according to the target compensation coefficient and the initial data voltage.

The application relates to a display device and a compensation method thereof. The pixel circuit of the display device includes a driving transistor and a light-emitting device, which are connected to a first node. The compensation method firstly obtains the initial data voltage of a target sub-pixel, obtain and determine the voltage offset of the first node based on the initial data voltage and the correlation curve between the data voltage and the voltage offset of the first node, and according to the initial data voltage and the voltage offset of the first node determine the target date voltage of the target sub-pixel. In this application, the voltage offset of the first node is obtained according to the initial data voltage input to the target sub-pixel and the correlation curve between the data voltage and the voltage offset of the first node, and the data voltage input to the target sub-pixel is corrected according to the voltage offset of the first node. Thus, a technical problem of deviation due to a potential difference between a gate terminal and a source terminal of a driving transistor is eliminated, and an operating current flowing into a light-emitting device is corrected.

In the above-mentioned embodiments, the description of each embodiment has its own emphasis, for the parts not detailed in one embodiment, references are made to the relevant descriptions of other embodiments.

The display device and the compensation method thereof provided by the embodiments of the present application are described in detail. T the principle and implementation of this application are expounded with specific embodiments herein. The description of the above embodiments is merely provided to help understand the technical solution and the core idea of the present application, those skilled in the art should understand that they can still modify the technical solutions recorded in the above-mentioned embodiments, or replace some technical features with equivalents. However, these modifications or substitutions do not make the essence of the corresponding technical solution deviate from the scope of the technical solution of each embodiment of the application.

What is claimed is:

1. A compensation method of a display device, wherein the display device comprises a plurality of sub-pixels with pixel circuits, and each of the pixel circuits comprises a switching transistor, a driving transistor and a light-emitting device; wherein a first electrode of the driving transistor is connected with a first potential line, a second electrode of the driving transistor and an anode of the light-emitting device are electrically connected with a first node, a first electrode of the switching transistor is connected with a data signal terminal, and a second electrode of the switching transistor is connected with a second node, wherein the compensation method comprises:

obtaining an initial data voltage of a target sub-pixel;

obtaining a correlation curve between a data voltage and a voltage offset of the first node;

determining the voltage offset of the first node according to the initial data voltage and the correlation curve between the data voltage and the voltage offset of the first node;

determining a target data voltage of the target sub-pixel according to the initial data voltage and the voltage offset of the first node; and inputting the target data voltage to the data signal terminal of the target sub-pixel.

2. The compensation method of claim 1, wherein a cathode of the light-emitting device is electrically connected with a second potential line, and the obtaining of the correlation curve between the data voltage and the voltage offset of the first node comprises:

obtaining a first test voltage of the second potential line of one test sub-pixel of the plurality of sub-pixels under a reference data voltage;

obtaining a plurality of second test voltages of the second potential line of the test sub-pixel under different test data voltages;

obtaining a correlation curve between the data voltage and a voltage offset of the second potential line according to a plurality of differences between the first test voltage and the second test voltages, obtaining a correlation curve between the data voltage and the voltage offset of the first node of the test sub-pixel according to the correlation curve between the data voltage and the voltage offset of the second potential line and based on a correlation curve between the voltage offset of the second potential line and the voltage offset of the first node; and obtaining a correlation curve between the data voltage and the voltage offset of the first node of the display device according to the correlation curve between the data voltage and the voltage offset of the first node of the test sub-pixel.

3. The compensation method of claim 2, wherein before the obtaining of the first test voltage of the second potential line of one test sub-pixel of the plurality of sub-pixels under the reference data voltage, the compensation method further comprises:

obtaining a plurality of input driving voltages of the second nodes of the plurality of sub-pixels and a plurality of input data voltages of the data signal terminals of the plurality of sub-pixels;

in a case that a difference between one of the plurality of input driving voltages and one of the plurality of input data voltage is less than a first threshold, one of the plurality of sub-pixels is the test sub-pixel.

4. The compensation method of claim 2, wherein the obtaining of the correlation curve between the data voltage and the voltage offset of the first node of the display device according to the correlation curve between the data voltage and the voltage offset of the first node of the test sub-pixel comprises:

obtaining correlation curves between the data voltages and the voltage offsets of the first nodes of the test sub-pixels, and fitting the correlation curves between the data voltages and the voltage offsets of the first nodes of the test sub-pixels to obtain the correlation curve between the data voltage and the voltage offset of the first node of the display device.

5. The compensation method of claim 2, wherein a display gray scale of the test sub-pixel under the reference data voltage is 0, and the display gray scale of the test sub-pixel under different test data voltages is greater than 0.

6. The compensation method of claim 1, wherein a cathode of the light-emitting device is electrically connected with a second potential line, and the obtaining of the correlation curve between the data voltage and the voltage offset of the first node comprises:

obtaining a third test voltage of the first node of one test sub-pixel of the plurality of sub-pixels under a reference data voltage;

obtaining a plurality of fourth test voltages of the first node of the test sub-pixel under different test data voltages;

obtaining a correlation curve between the data voltage and the voltage offset of the first node of the test sub-pixel according to a plurality of differences between the third test voltage and fourth test voltages, and obtaining a correlation curve between the data voltage and the voltage offset of the first node of the display device according to the correlation curve between the data voltage and the voltage offset of the first node of the test sub-pixel.

7. The compensation method of claim 6, wherein the obtaining of the correlation curve between the data voltage and the voltage offset of the first node of the display device according to the correlation curve between the data voltage and the voltage offset of the first node of the test sub-pixel comprises:

obtaining correlation curves between the data voltages and the voltage offsets of the first nodes of the test sub-pixels; and fitting the correlation curves between the data voltages and the voltage offsets of the first nodes of the test sub-pixels to obtain the correlation curve between the data voltage and the voltage offset of the first node of the display device.

8. The compensation method of claim 1, wherein the determining the target data voltage of the target sub-pixel according to the initial data voltage and the voltage offset of the first node comprises:

obtaining a first output voltage of the first node;

obtaining a second output voltage of the first node according to the first output voltage and the voltage offset of the first node; and determining the target data voltage of the target sub-pixel according to the initial data voltage and the second output voltage.

9. The compensation method of claim 1, wherein the determining the target data voltage of the target sub-pixel according to the initial data voltage and the voltage offset of the first node comprises:

obtaining an initial compensation coefficient of the initial data voltage;

determining a compensation offset coefficient according to the initial data voltage and the voltage offset of the first node;

determining a target compensation coefficient of the initial data voltage according to the initial compensation coefficient and the compensation offset coefficient; and determining the target data voltage of the target sub-pixel according to the target compensation coefficient and the initial data voltage.

10. A display device, wherein the display device comprises a display panel, the display panel comprises a plurality of sub-pixels with pixel circuits, wherein each of the pixel circuits comprises a switching transistor, a driving transistor and a light-emitting device; a first electrode of the driving transistor is connected with a first potential line; a second electrode of the driving transistor and an anode of the light-emitting device are electrically connected with a first node; a first electrode of the switching transistor is connected with a data signal terminal; and a second electrode of the switching transistor is connected with a second node; wherein, the display device further comprises:

a data processor, the data processor is configured to obtain an initial data voltage of a target sub-pixel, and to input the target data voltage to the data signal terminal of the target sub-pixel;

a detection device, the detection device is configured to obtain a correlation curve between a data voltage and a voltage offset of the first node, and to determine the voltage offset of the first node according to the initial data voltage and the correlation curve between the data voltage and the voltage offset of the first node;

a controller, the controller is configured to determine a target data voltage of the target sub-pixel according to the initial data voltage and the voltage offset of the first node.

11. The display device of claim 10, wherein the pixel circuit further comprises:

a detection device connected to a cathode of the light-emitting device and a second potential line and configured to obtain the potential of the second potential line.

12. The display device of claim 11, wherein a cathode of the light-emitting device is electrically connected with a second potential line, and the obtaining of the correlation curve between the data voltage and the voltage offset of the first node comprises:

obtaining a first test voltage of the second potential line of one test sub-pixel of the plurality of sub-pixels under a reference data voltage;

obtaining a plurality of second test voltages of the second potential line of the test sub-pixel under different test data voltages;

obtaining a correlation curve between the data voltage and a voltage offset of the second potential line according to a plurality of differences between the first test voltage and the second test voltages, obtaining a correlation curve between the data voltage and the voltage offset of the first node of the test sub-pixel according to the correlation curve between the data voltage and the voltage offset of the second potential line and based on a correlation curve between the voltage offset of the second potential line and the voltage offset of the first node; and obtaining a correlation curve between the data voltage and the voltage offset of the first node of the display device according to the correlation curve between the data voltage and the voltage offset of the first node of the test sub-pixel.

13. The display device of claim 10, wherein a cathode of the light-emitting device is electrically connected with a second potential line, and the obtaining of the correlation curve between the data voltage and the voltage offset of the first node comprises:

obtaining a first test voltage of the second potential line of one test sub-pixel of the plurality of sub-pixels under a reference data voltage;

obtaining a plurality of second test voltages of the second potential line of the test sub-pixel under different test data voltages;

obtaining a correlation curve between the data voltage and a voltage offset of the second potential line according to a plurality of differences between the first test voltage and the second test voltages, obtaining a correlation curve between the data voltage and the voltage offset of the first node of the test sub-pixel according to the correlation curve between the data voltage and the voltage offset of the second potential line and based on a correlation curve between the voltage offset of the second potential line and the voltage offset of the first node; and obtaining a correlation curve between the data voltage and the voltage offset of the first node of the display device according to the correlation curve between the data voltage and the voltage offset of the first node of the test sub-pixel.

14. The display device of claim 10, wherein a cathode of the light-emitting device is electrically connected with a second potential line, and the obtaining of the correlation curve between the data voltage and the voltage offset of the first node comprises:

obtaining a third test voltage of the first node of one test sub-pixel of the plurality of sub-pixels under a reference data voltage;

obtaining a plurality of fourth test voltages of the first node of the test sub-pixel under different test data voltages;

obtaining a correlation curve between the data voltage and the voltage offset of the first node of the test sub-pixel according to a plurality of differences between the third test voltage and fourth test voltages; and obtaining a correlation curve between the data voltage and the voltage offset of the first node of the display device according to the correlation curve between the data voltage and the voltage offset of the first node of the test sub-pixel.

15. The display device of claim 10, wherein before the obtaining of the first test voltage of the second potential line of one test sub-pixel of the plurality of sub-pixels under the reference data voltage, the compensation method further comprises:

obtaining a plurality of input driving voltages of the second nodes of the plurality of sub-pixels and a plurality of input data voltages of the data signal terminals of the plurality of sub-pixels;

in a case that a difference between one of the plurality of input driving voltages and one of the plurality of input data voltage is less than a first threshold, one of the plurality of sub-pixels is the test sub-pixel.

16. The display device of claim 10, wherein the obtaining of the correlation curve between the data voltage and the voltage offset of the first node of the display device according to the correlation curve between the data voltage and the voltage offset of the first node of the test sub-pixel comprises:

obtaining correlation curves between the data voltages and the voltage offsets of the first nodes of the test sub-pixels; and fitting the correlation curves between the data voltages and the voltage offsets of the first nodes of the test sub-pixels to obtain the correlation curve between the data voltage and the voltage offset of the first node of the display device.

17. The display device of claim 10, wherein a display gray scale of the test sub-pixel under the reference data voltage is 0, and the display gray scale of the test sub-pixel under different test data voltages is greater than 0.

18. The display device of claim 10, wherein the determining of the target data voltage of the target sub-pixel according to the initial data voltage and the voltage offset of the first node comprises:

obtaining a first output voltage of the first node;

obtaining a second output voltage of the first node according to the first output voltage and the voltage offset of the first node; and determining the target data voltage of the target sub-pixel according to the initial data voltage and the second output voltage.

19. The display device of claim 10, wherein the determining of the target data voltage of the target sub-pixel according to the initial data voltage and the voltage offset of the first node comprises:

obtaining an initial compensation coefficient of the initial data voltage;

determining a compensation offset coefficient according to the initial data voltage and the voltage offset of the first node;

determining a target compensation coefficient of the initial data voltage according to the initial compensation coefficient and the compensation offset coefficient; and determining the target data voltage of the target sub-pixel according to the target compensation coefficient and the initial data voltage.

* * * * *